(12) United States Patent
Lin et al.

(10) Patent No.: US 11,101,548 B2
(45) Date of Patent: Aug. 24, 2021

(54) ANTENNA AND WIRELESS COMMUNICATION DEVICE USING THE SAME

(71) Applicant: Chiun Mai Communication Systems, Inc., New Taipei (TW)

(72) Inventors: Yen-Hui Lin, New Taipei (TW); Wen-Yi Kuo, New Taipei (TW); Po-Ching Huang, New Taipei (TW); Chueh-Chuan Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/550,581

(22) Filed: Aug. 26, 2019

(65) Prior Publication Data

US 2020/0076060 A1 Mar. 5, 2020

(30) Foreign Application Priority Data

Aug. 31, 2018 (CN) .......................... 201811012451.1

(51) Int. Cl.
*H01Q 1/24* (2006.01)
*H01Q 1/22* (2006.01)
*H04B 1/3827* (2015.01)

(52) U.S. Cl.
CPC ........... *H01Q 1/243* (2013.01); *H01Q 1/2266* (2013.01); *H04B 1/3833* (2013.01)

(58) Field of Classification Search
CPC ............................... H01Q 1/243; H01Q 1/244
See application file for complete search history.

(56) References Cited

U.S. PATENT DOCUMENTS

| 2007/0080875 | A1* | 4/2007 | Liao ........................ H01Q 1/243 343/702 |
| 2008/0074329 | A1* | 3/2008 | Caballero .............. H01Q 1/243 343/702 |
| 2012/0176279 | A1 | 7/2012 | Merz et al. |
| 2017/0020012 | A1 | 1/2017 | Park et al. |
| 2017/0214126 | A1* | 7/2017 | Abreu ....................... H01Q 1/44 |
| 2018/0026348 | A1 | 1/2018 | Lee et al. |
| 2018/0107913 | A1* | 4/2018 | Shi ........................... H01Q 7/00 |
| 2019/0305403 | A1* | 10/2019 | Wang ....................... H01Q 1/10 |
| 2019/0306292 | A1* | 10/2019 | Hu ........................ H04M 1/0235 |

(Continued)

FOREIGN PATENT DOCUMENTS

| CN | 102646862 B | 1/2015 |
| CN | 106357845 A | 1/2017 |

(Continued)

*Primary Examiner* — Seokjin Kim
(74) *Attorney, Agent, or Firm* — ScienBiziP, P.C.

(57) ABSTRACT

An antenna of reduced size but of multiple functions according to manual adjustment includes a side frame made of metallic material, a feeding portion, and a moving module. The side frame defines first and second gaps each passing through the side frame to form at least one radiating portion. The feeding portion can feed current to either of the radiating portions. The metallic and movable moving module including an extending portion is movable relative to the side frame. In a first position, the extending portion is not connected to any radiating portion, and when moved to a second position, the extending portion is connected to one of the radiating portions.

20 Claims, 16 Drawing Sheets

(56) References Cited

U.S. PATENT DOCUMENTS

| | | | |
|---|---|---|---|
| 2019/0334226 A1* | 10/2019 | Zhao | H01Q 5/307 |
| 2020/0058981 A1* | 2/2020 | Chang | H01Q 5/30 |
| 2020/0068054 A1* | 2/2020 | Kim | H01Q 9/30 |
| 2020/0076058 A1* | 3/2020 | Zhang | H01Q 1/38 |
| 2020/0161740 A1* | 5/2020 | Islam | H04M 1/72569 |

FOREIGN PATENT DOCUMENTS

| | | |
|---|---|---|
| CN | 207559066 U | 6/2018 |
| TW | M366840 U | 10/2009 |
| TW | 201804671 A | 2/2018 |

* cited by examiner

US 11,101,548 B2

ANTENNA AND WIRELESS COMMUNICATION DEVICE USING THE SAME

FIELD

The subject matter herein generally relates to antennas.

BACKGROUND

Electronic devices, such as mobile phones and personal digital assistants, are preferred with a full-screen design. However, reducing the size of a keep-out-zone for an antenna is one obstacle to fulfill a full-screen design.

Therefore, there is room for improvement within the art.

BRIEF DESCRIPTION OF THE DRAWINGS

Implementations of the present disclosure will now be described, by way of embodiment, with reference to the attached figures.

DETAILED DESCRIPTION

Figure 1:
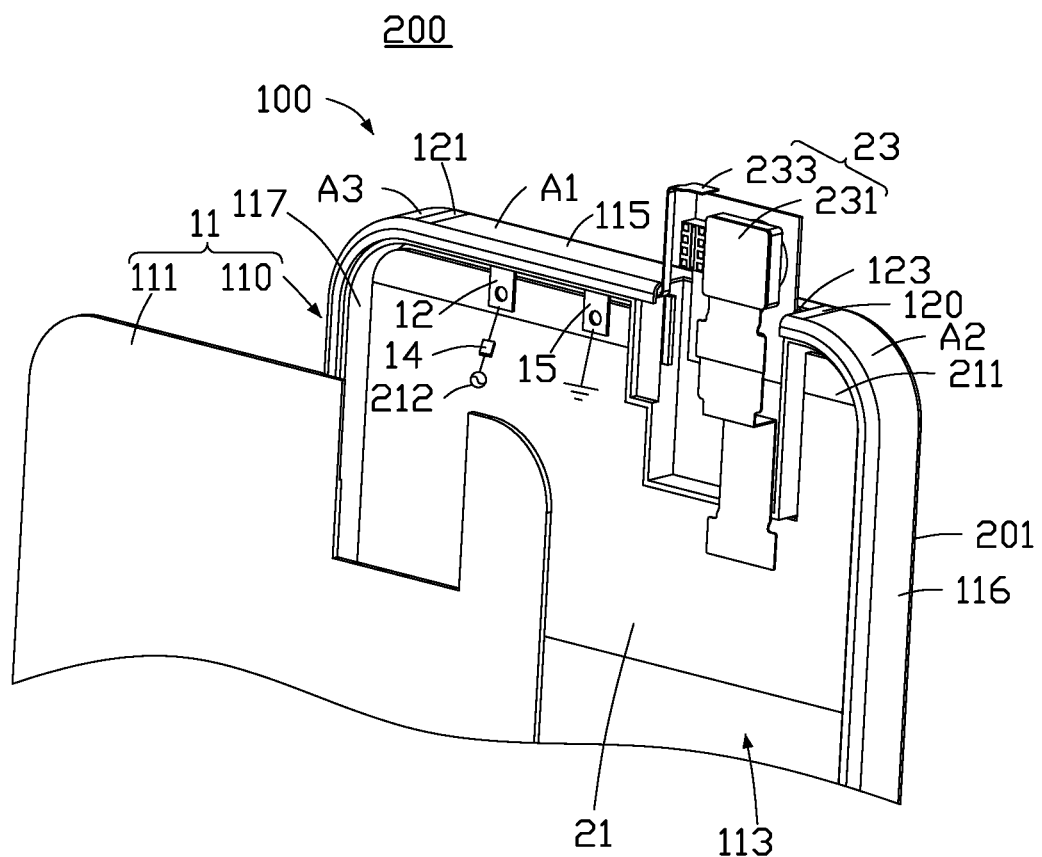
FIG. 1 is a view of part of a disassembled antenna structure applicable in a wireless communication device according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using the same.

Figure 2:
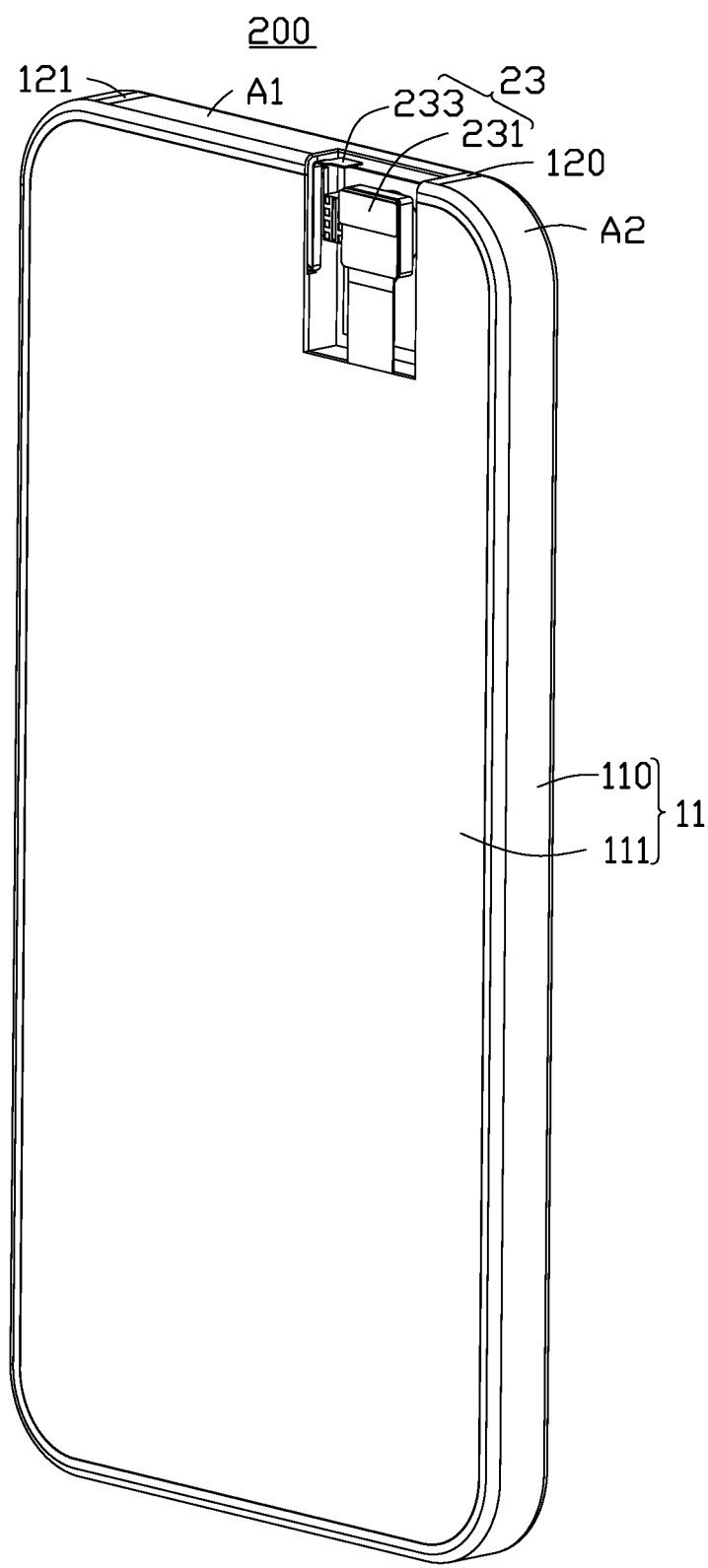
FIG. 2 is an isometric view of the wireless communication device of FIG. 1 when a moving module is moved to a first position.

FIG. 1 2 illustrates an antenna structure 100 in a wireless communication device 200 according to a first embodiment. The wireless communication device 200 can be, for example, a mobile phone or a personal digital assistant. The antenna structure 100 can receive and transmit wireless signals.

Figure 3:
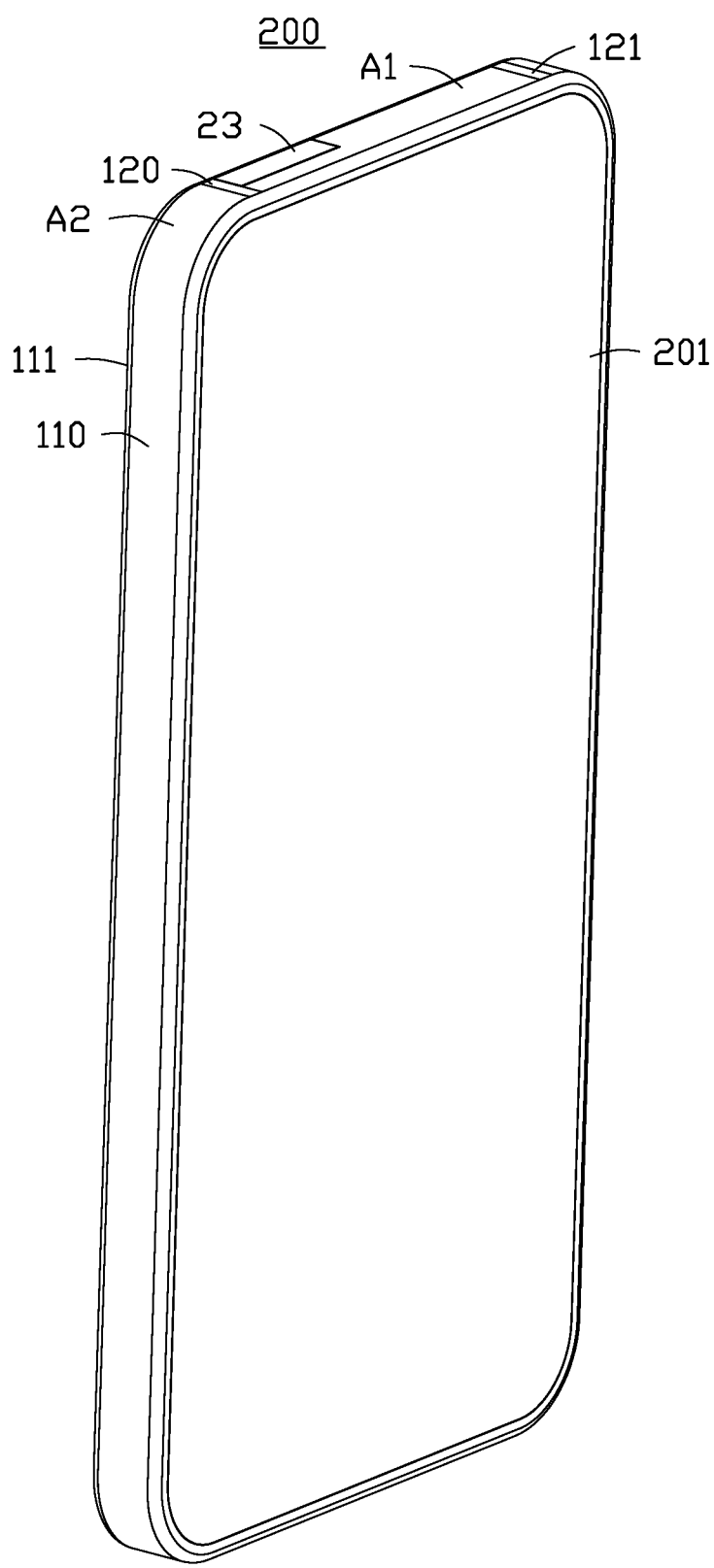
FIG. 3 is an isometric view of the wireless communication device of FIG. 1 when the moving module is moved to a second position.

Referring to FIGS. 2 and 3, the antenna structure 100 includes a housing 11, a first feeding portion 12, a matching circuit 14, and a connecting portion 15.

The housing 11 can be an outer shell of the wireless communication device 200. The housing 11 at least includes a side frame 110 and a backboard 111. In an embodiment, the side frame 110 is substantially annular and made of metallic material. An opening (not labeled) is defined in a side of the side frame 110. The opening is configured for receiving a displaying unit 201 (as shown in FIG. 1 and FIG. 3). In an embodiment, the displaying unit 201 includes an integrated displaying surface without any gaps or seams. The displaying surface is exposed from the opening.

The backboard 111 can be made of metallic material or non-metallic material. The backboard 111 is positioned around a periphery of the side frame 110 opposite to the displaying unit 201. The backboard 111 is spaced apart from and parallel to the displaying surface. In an embodiment, the side frame 110 and the backboard 111 are integrally formed together. In an embodiment, the backboard 111 and the side frame 110 cooperatively form a receiving space 113. The receiving space 113 is configured for receiving a substrate, a processing unit, and other electronic components and modules.

In an embodiment, the side frame 110 at least includes an end portion 115, a first side portion 116, and a second side portion 117. In an embodiment, the end portion 115 can be a top end of the wireless communication device 200. The first side portion 116 is opposite to the second side portion 117. The first side portion 116 and the second side portion 117 are positioned at two opposite ends of the end portion 115. In an embodiment, each of the first side portion 116 and the second side portion 117 is perpendicularly connected to one end of the end portion 115. Each of the end portion 115, the first side portion 116, the second side portion 117 is connected to the backboard 111 and the displaying unit 201. In an embodiment, a length of each of the side portion 116 and of the second side portion 117 is longer than a length of the end portion 115.

In an embodiment, the side frame 112 defines a first gap 120, a second gap 121, and a cut 123. The first gap 120 and the second gap 121 are defined at the end portion 115 and spaced apart from each other. The first gap 120 is defined at the end portion 115 adjacent to the first side portion 116. The second gap 121 is defined at the end portion 115 and is adjacent to the second side portion 117. The cut 123 is defined at the end portion 115 adjacent to the first gap 120. In an embodiment, the cut 123 is defined at a side of the side frame 110 adjacent to the backboard 111, and extends toward a side of the displaying unit 201. Therefore, a width of the side frame 110 with the cut 123 is narrower than that of other portion of the side frame 110. In other embodiment, the cut 123 passes through the side frame 110.

In an embodiment, the first gap 120 and the second gap 121 both pass through the side frame 110. Thus, the first gap 120 and the second gap 121 cooperatively divide the side frame 112 into three radiating portions including a first radiating portion A1, a second radiating portion A2, and the third radiating portion A3. A portion of the side frame 112 between the first gap 120 and the second gap 121 forms the first radiating portion A1. A portion of the side frame 110 extending from a side of the first gap 120 away from the second gap 121 and toward the first side portion 116 forms the second radiating portion A2. A portion of the side frame 120 extending from a side the second gap 121 away from the first gap 120 and toward the second side portion 117 forms the third radiating portion A3.

In an embodiment, the first gap 120 and the second gap 121 are filled with insulating material, such as plastic, rubber, glass, wood, ceramic, or the like.

In an embodiment, dimensions of the wireless communication device 200 are about 70 mm by 140 mm by 8 mm. The wireless communication device 200 further includes a baseboard 21 and a moving module 23. The baseboard 21 is a printed circuit board (PCB), and can be made of dielectric material such as epoxy glass fiber (FR4). The baseboard 21 is positioned in the receiving space 113. A keep-out-zone 211 for electromagnetic isolation of the antenna structure 100 is formed at a side of the baseboard 21 adjacent to the end portion 115. The purpose of the keep-out-zone 211 is to delineate an area on the baseboard 21 from which other electronic elements (such as a camera, a vibrator, a speaker, a battery, a charge coupled device, etc.) are excluded, to prevent the electronic element from interfering with the antenna structure 100.

In an embodiment, the moving module 23 at least includes an electronic element 231 and an extending portion 233. The electronic element 231 is an optical module. The electronic element 231 is positioned on the baseboard 21, and electrically connected to the baseboard 21. In an embodiment, the optical module can include at least one of a camera module, an auxiliary display screen, an ambient light sensor, and a proximity sensor. In other embodiment, the electronic element 231 can be an acoustic module. The acoustic module can include at least one of a speaker, a microphone, and a vibrating motor. The extending portion 233 is substantially L-shaped. The extending portion 233 is made of metallic material and positioned at one side of the electronic element 231.

The moving module 23 corresponds to the cut 123. The moving module 23 can be moved relative to the side frame 110. For example, the moving module 23 can be slid or rotated relative to the side frame 110. In this embodiment, the moving module 23 can be slid relative to the side frame 110. When the moving module 23 is slid to a first position, the moving module 23 is received into the side frame 110, wherein, the electronic element 231 is closed, and the extending portion 233 is spaced apart and is not connected to the at least one radiating portion, such as the first radiating portion A1, or the extending portion 233 is directly grounded. When the moving module 23 is slid to a second position, the moving module 23 is exposed from the cut 123, and the electronic element 231 is open wherein the extending portion 233 can be moved with the electronic element 231 to contact and electrically connected to the at least one radiating portion, such as the first radiating portion A1. Electromagnetic interference when the extending portion 233 is slid to the second portion is greater than that generated by the moving module 23 to the side frame 110 when the extending portion 233 is slid to the first portion. Thus, the moving module 23 can effectively lengthen the first radiating portion A1, to improve radiating characteristics of the first radiating portion A1.

Figure 4:
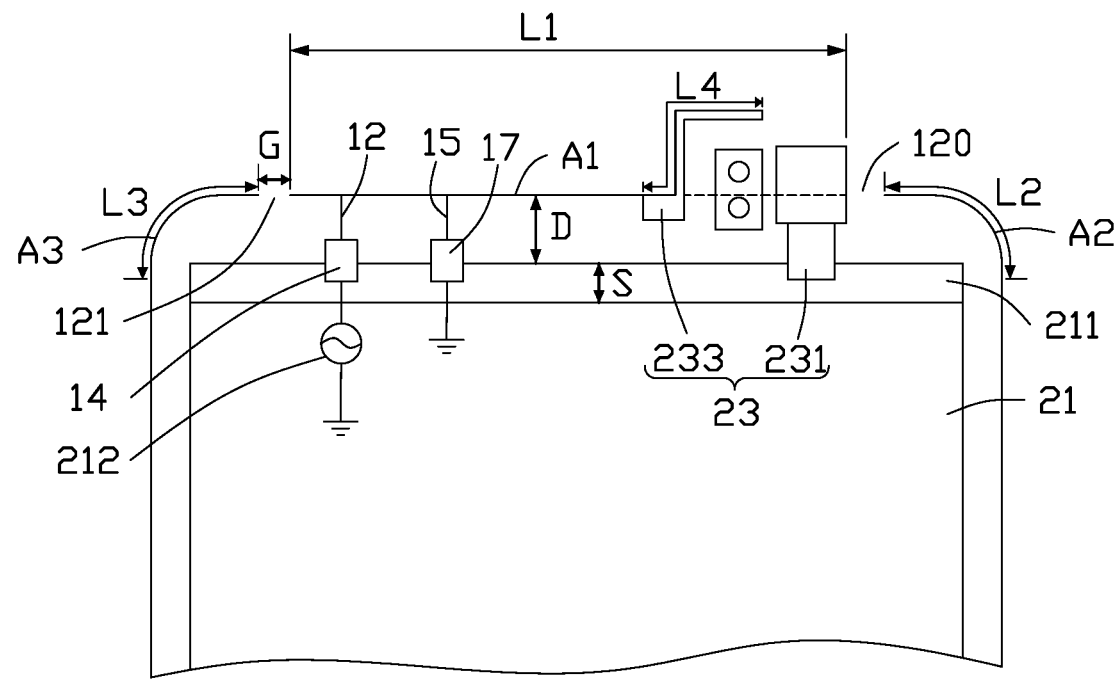
FIG. 4 is a circuit diagram of the wireless communication device of FIG. 2.

Referring to FIG. 4, widths of the first gap 120 and of the second gap 121 are G. A length of the first radiating portion A1 is L1. A length of the second radiating portion A2 is L2. A length of the third radiating portion A3 is L3. A length of the extending portion 233 is L4. A width of the keep-out-zone 211 is S. A distance between the side frame 110 and the baseboard 21 is D. In an embodiment, G=2 mm, L1=45.5 mm, L2=10.9 mm, L3=15.7 mm, L4=16.2 mm, S=4 mm, and D=3.2 mm.

In an embodiment, the first feeding portion 12 is received in the receiving space 113. The first feeding portion 12 can be a structure for connecting such as a metal sheet, a screw, a feeder, a probe, or the like. An end of the first feeding portion 12 is electrically connected to one side of the first radiating portion A1 adjacent to the second gap 121. Another end of the first feeding portion 12 is electrically connected to an end of a first feeding source 212 positioned on the baseboard 21. The first feeding portion 12 is configured for feeding current to the first radiating portion A1.

The connecting portion 15 is received in the receiving space 113, and spaced apart from the first feeding portion 12. The connecting portion 15 can be a connecting structure such as a metal sheet, a screw, a feeder, a probe, or the like. An end of the connecting portion 15 is electrically connected to the first radiating portion A1. Another end of the connecting portion 15 is grounded.

Figure 5:
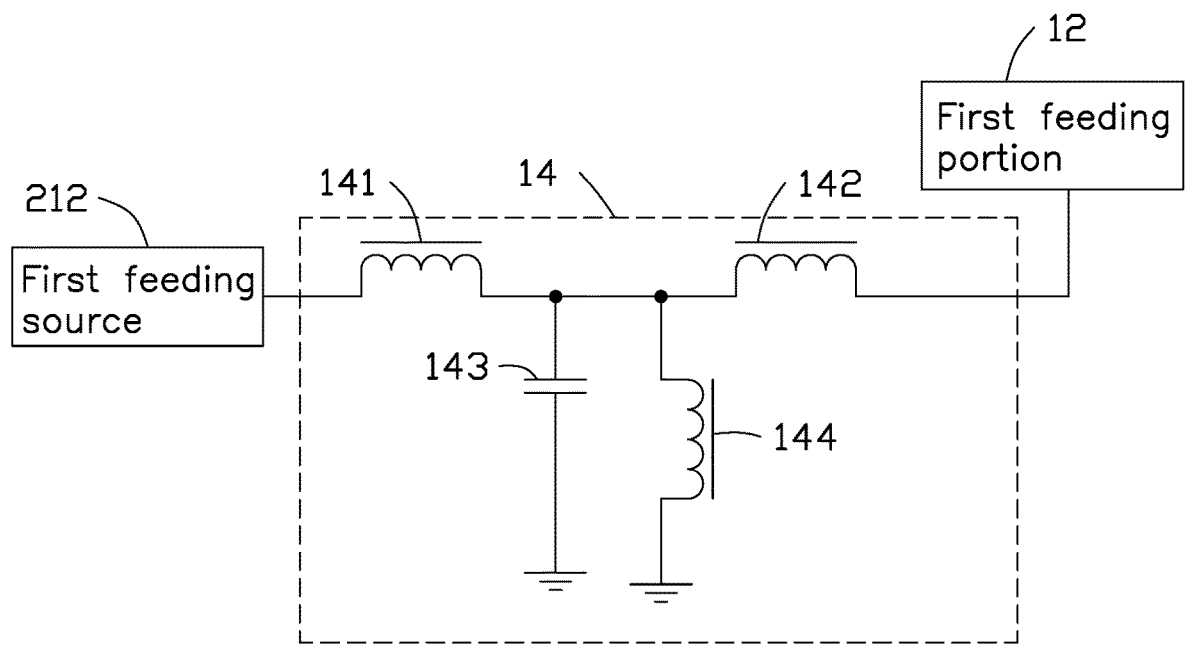
FIG. 5 is a circuit diagram of a matching circuit of the wireless communication device of FIG. 4.

Referring to FIG. 5, in an embodiment, the matching circuit 14 is configured for adjusting an impedance of the first radiating portion A1. The matching circuit 42 includes a first matching element 141, a second matching element 142, a third matching element 143, and the fourth element 144.

An end of the first matching element 141 is electrically connected to the first feeding source 212. Another end of the first matching element 141 is electrically connected in series to the first feeding portion 12 through the second matching element 142, thereby being electrically connected to the first radiating portion A1 through the first feeding portion 12. An end of the third matching element 143 is electrically connected between the first matching element 141 and the second matching element 142. Another end of the third matching element 143 is grounded. Thus, the third matching element 143 is electrically connected in parallel between the first matching element 141 and the second matching element 142.

In an embodiment, the first matching element 141, the second matching element 142, and the fourth matching element 144 are inductors. The third matching element 143 is a capacitor. Inductance values of the first matching element 141, the second matching element 142, and the fourth matching element 144 are 3.3 nH, 3.3 nH, and 5.1 nH, respectively. A capacitance value of the second matching component 142 is 2 pF. In other embodiments, the first matching element 141, the second matching element 142, the third matching element 143, and the fourth matching element 144 can be other inductors, capacitors, or a combination thereof, not being limited to the above described inductors and capacitors.

When the first feeding source 212 supplies current, the current flows to the first radiating portion A1 through the first feeding portion 12 and the matching circuit 14. Thus, the first radiating portion A1 forms a first antenna in a first operating mode. The first operating mode generates radiation signals in a first radiation frequency band. In an embodiment, the first antenna is a diversity antenna. The first working mode includes long term evolution advanced (LTE-A) low, middle, and high frequency modes. The first radiation band includes frequencies of 700-960 MHz and 1710-2690 MHz.

In an embodiment, the antenna structure 100 further includes a switching circuit 17. The switching circuit 17 is received in the receiving space 113. An end of the switching circuit 17 is electrically connected to the connecting portion 15 and electrically connects the connecting portion 15 to the first radiating portion A1. Another end of the switching circuit 17 is grounded.

Figure 6:
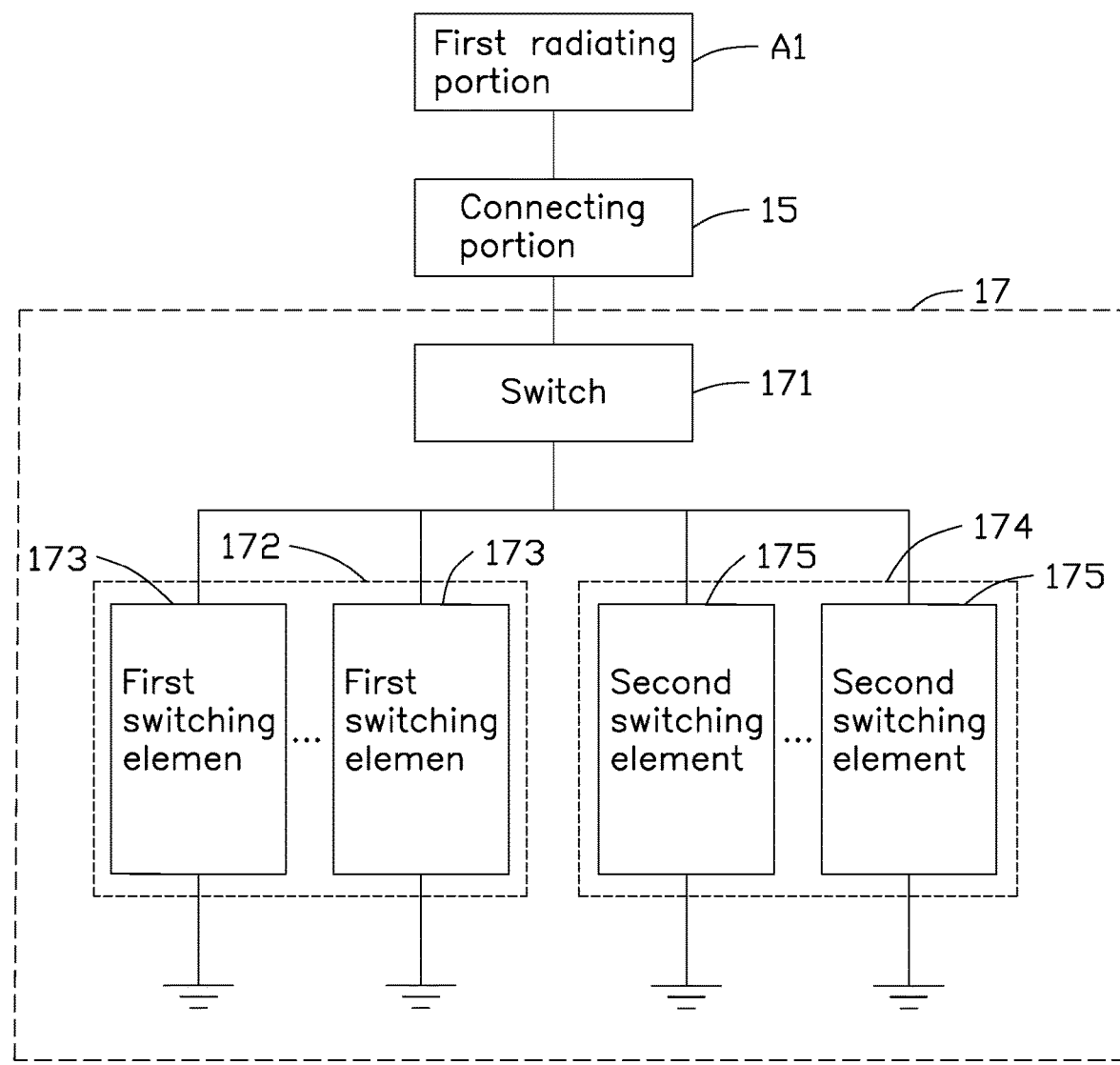
FIG. 6 is a circuit diagram of a switching circuit of the wireless communication device of FIG. 4.

Referring to FIG. 6, the switching circuit 17 includes a switch 171, a first switching unit 172, and a second switching unit 174. The switch 171 is electrically connected to the first radiating portion A1 through the connecting portion 15. The first switching unit 172 includes at least one first switching elements 173. Each of the first switching element 173 can be an inductor, a capacitor, or a combination of inductor and capacitor. The first switching elements 173 are connected in parallel with each other. An end of each first switching element 173 is electrically connected to the switch 171. The other end of each first switching element 173 is grounded. The second switching unit 174 includes at least one second switching elements 175. Each of the second switching element 175 can be an inductor, a capacitor, or a combination of the two. The second switching elements 175 are connected in parallel with each other. An end of each second switching element 175 is electrically connected to the switch 171. The other end of each second switching element 175 is grounded.

Under the control of the switch 171, the first radiating portion A1 can be switched to connect with any one of the first switching elements 173 or the second switching elements 175. Since each first switching element 173 and each second switching element 175 has a different impedance, the frequency band of the first radiating portion A1 is able to be effectively adjusted.

For example, in an embodiment, the first switching unit 172 includes three different switching elements 173. When the moving module 23 is slid to the first position, under control of the first switching unit 172, the first radiating portion A1 can be switched to connect with any one of the three different first switching elements 173 (e.g. switched to inductors having inductance values of 15 nH, 27 nH and 80 nH), the antenna structure 100 can switch to different low frequencies. Then, a low frequency band of the antenna structure 100 can cover a frequency band of 700-960 MHz.

When the moving module 23 is slid to the second position, under control of the second switching unit 174, the first radiating portion A1 can be switched to connect with any one of the three different second switching elements 175 (e.g. switched to inductors having inductance values of 10 nH, 20 nH and 30 nH), thus the antenna structure 100 can switch to different low frequencies. Then, a low frequency band of the antenna structure 100 can cover the frequency band of 700-960 MHz. An impedance of each first switching element 173 is greater than that of each second switching element 175 when the first radiating portion A1 is operating at one frequency band.

Figure 7:
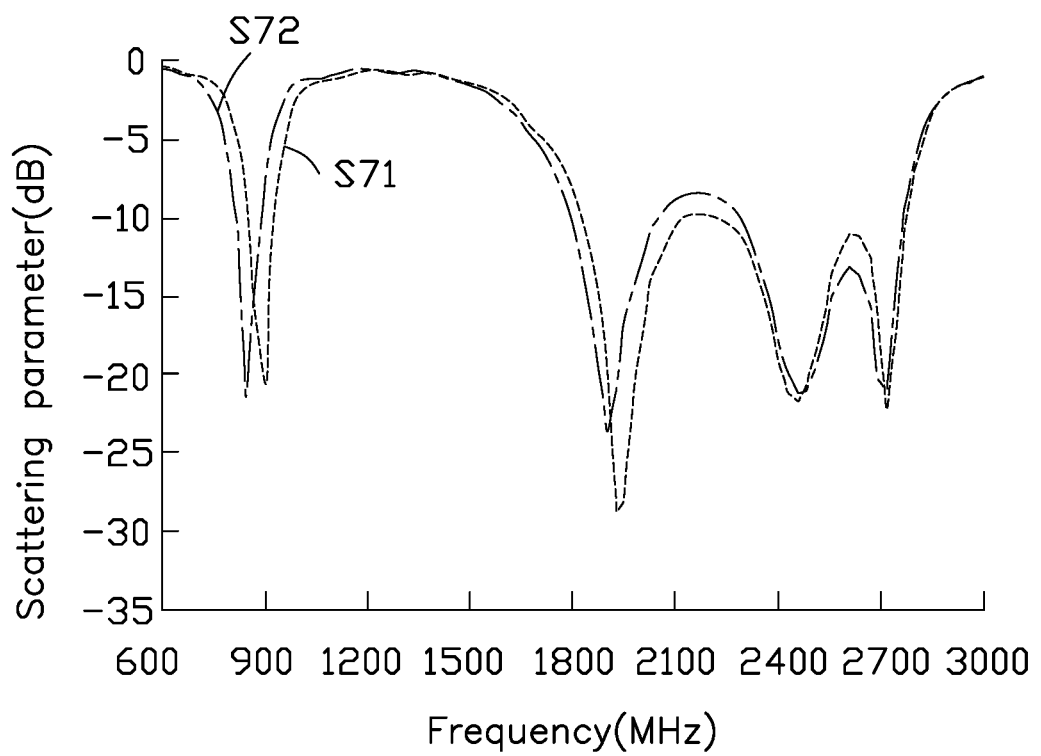
FIG. 7 is a scattering parameter graph of a first radiating portion when the moving module of FIG. 4 is moved to the second position.

FIG. 7 shows a scattering parameter graph of the radiating portion A1 when the moving module 23 is slid to the second position. Curve S71 is a scattering parameter of the radiating portion A1 when the moving module 23 is slid to the second position without the extending portion 233. Curve S72 is a scattering parameter of the radiating portion A1 when the moving module 23 is slid to the second position with the extending portion 233.

Figure 8:
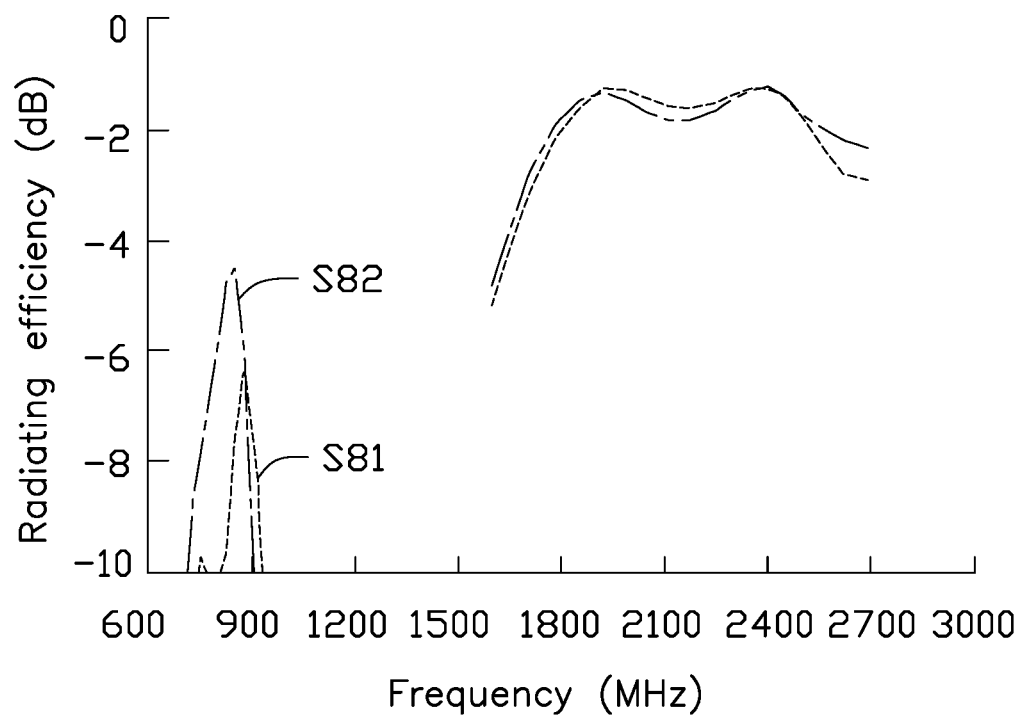
FIG. 8 is a radiating efficiency graph of the first radiating portion when the moving module of FIG. 4 is moved to the second position.

FIG. 8 shows a radiating efficiency graph of the radiating portion A1 when the moving module 23 is slid to the second position. Curve S81 is a radiating efficiency of the radiating portion A1 when the moving module 23 is slid to the second position without the extending portion 233. Curve S82 is a radiating efficiency of the radiating portion A1 when the moving module 23 is slid to the second position with the extending portion 233.

As shown in FIGS. 7 and 8, when the moving module 23 is slid to the second position with the extending portion 233, the extending portion 233 can lower radiating frequency of the first radiating portion A1 at middle and low frequency operating modes, to reduce influence of the extending portion 233 on the first radiation portion A1 and to increase a radiating efficiency of the first radiating portion A1 at middle and low frequency operating modes.

Figure 9:
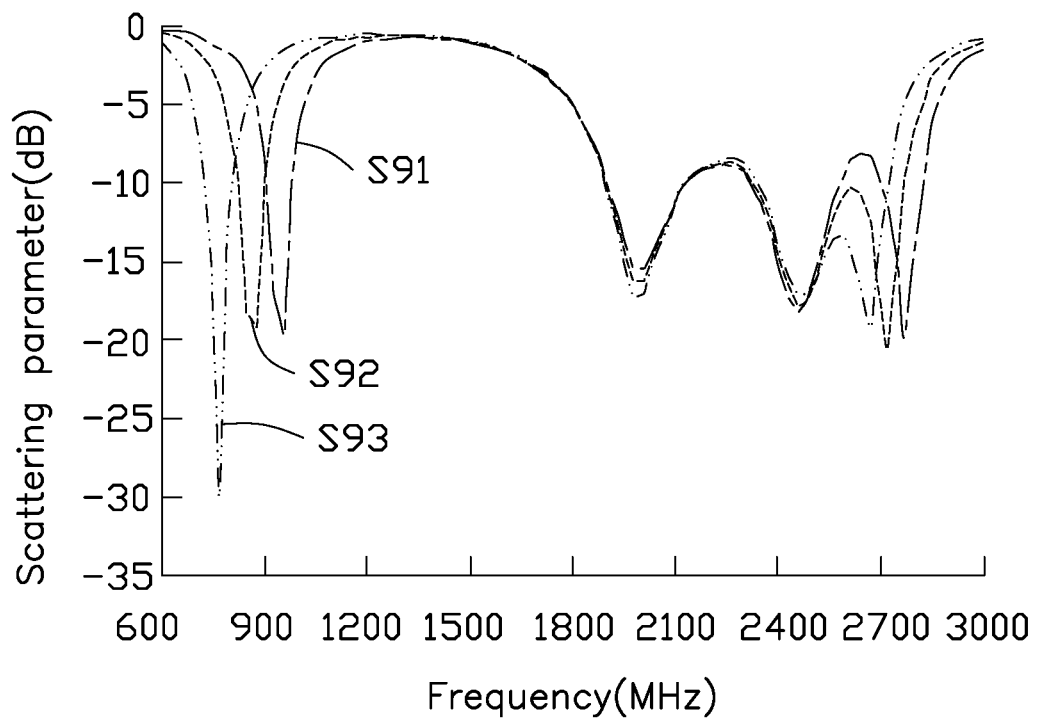
FIG. 9 is a scattering parameter graph of the first radiating portion when the moving module of FIG. 4 is moved to the first position and the switching circuit is switched to a first switching unit.

FIG. 9 shows a scattering parameter graph of the radiating portion A1 when the moving module 23 is slid to the first position and the switching circuit 17 is switched to the first switching unit 172. Curve S91 is a scattering parameter of the radiating portion A1 when the moving module 23 is slid to the first position and the switching circuit 17 is switched to the first switching unit 172 which has an inductance value of 15 nH. Curve S92 is a scattering parameter of the radiating portion A1 when the moving module 23 is slid to the first position and the switching circuit 17 is switched to the first switching unit 172 which has an inductance value of 27 nH. Curve S93 is a scattering parameter of the radiating portion A1 when the moving module 23 is slid to the first position and the switching circuit 17 is switched to the first switching unit 172 which has an inductance value of 80 nH.

Figure 10:
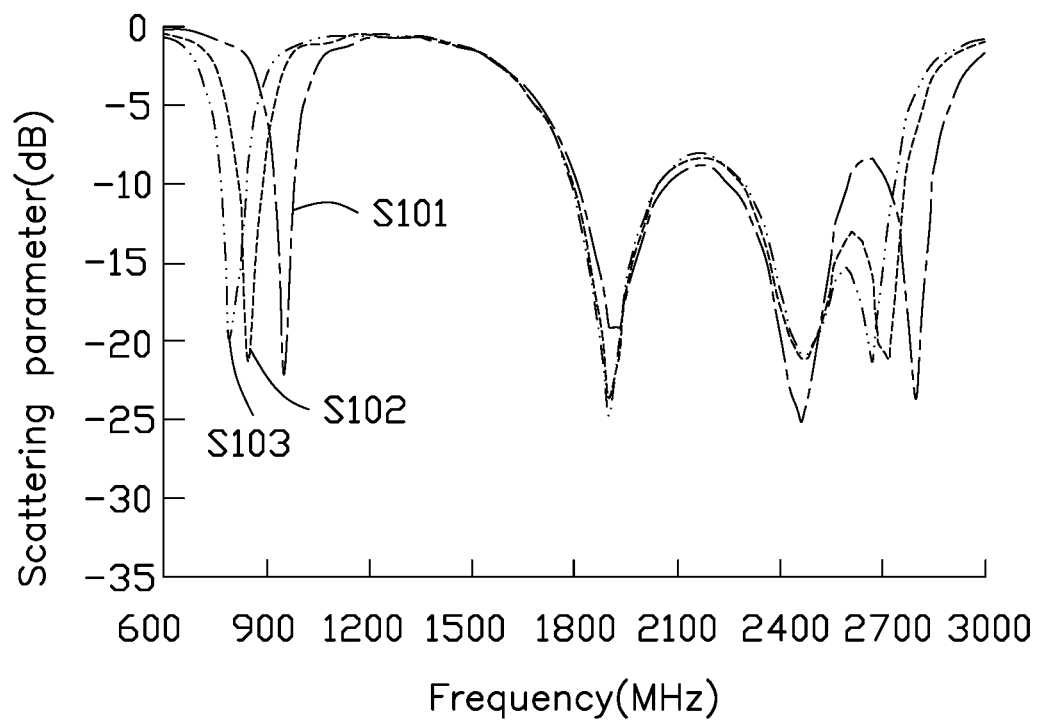
FIG. 10 is a scattering parameter graph of the first radiating portion when the moving module of FIG. 4 is moved to the second position and the switching circuit is switched to a second switching unit.

FIG. 10 shows a scattering parameter graph of the radiating portion A1 when the moving module 23 is slid to the second position and the switching circuit 17 is switched to the second switching unit 174. Curve S101 is a scattering parameter of the radiating portion A1 when the moving module 23 is slid to the second position and the switching circuit 17 is switched to the second switching unit 174 having an inductance value of 10 nH. Curve S102 is a scattering parameter of the radiating portion A1 when the moving module 23 is slid to the second position and the switching circuit 17 is switched to the second switching unit 174 having an inductance value of 20 nH. Curve S103 is a scattering parameter of the radiating portion A1 when the moving module 23 is slid to the second position and the switching circuit 17 is switched to the second switching unit 174 having an inductance value of 30 nH.

As shown in FIG. 9 and FIG. 10, different switching circuits (e.g. the first switching elements 173 and the second switching element 175) can be invoked or set by different states of the moving module 23 (e.g. moved to the first position or moved to the second position). The first radiating portion A1 has better low frequency characteristics whether the moving module 23 is moved to the first position or the second position (i.e., regardless of whether the electronic component 231 is in an open state or a closed state). The antenna structure 100 can cover the 700-960 MHz frequency band very well, and the scattering parameters of the antenna structure 100 are less than −5 dB.

In addition, the first radiating portion A1 can cover the middle and high frequency bands of 1710-2690 MHz whether the module 23 is in the first or the second position. The scattering parameters of the antenna structure 100 are less than −5 dB, which satisfies the design requirements of the diversity antenna. No matter how the switching circuit 17 is switched, the middle and high frequency bandwidths of the antenna structure 100 are not affected, and the structure 100 is suitable for the 2CA/3CA antenna design.

Figure 11:
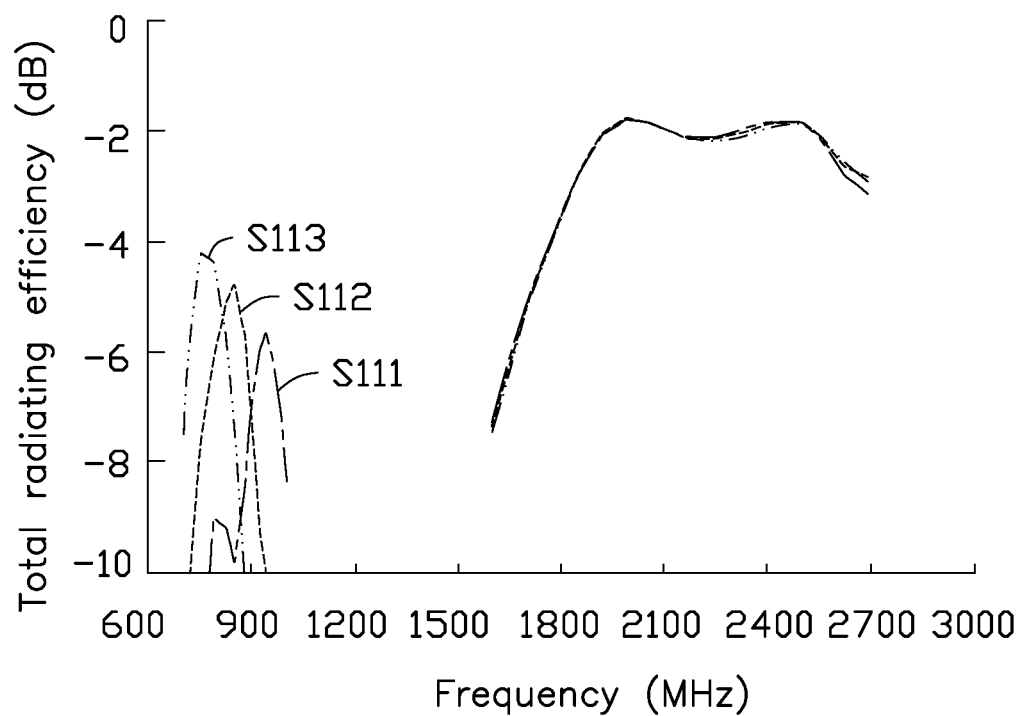
FIG. 11 is a total radiating efficiency graph of the first radiating portion when the moving module of FIG. 4 is moved to the first position and the switching circuit is switched to the first switching unit.

FIG. 11 shows a total radiating efficiency graph of the radiating portion A1 when the moving module 23 is slid to the first position and the switching circuit 17 is switched to the first switching unit 172. Curve S111 is a radiating efficiency of the radiating portion A1 when the moving module 23 is slid to the first position and the switching circuit 17 is switched to the first switching unit 172, which has an inductance value of 15 nH. Curve S112 is a radiating efficiency of the radiating portion A1 when the moving module 23 is slid to the first position and the switching circuit 17 is switched to the first switching unit 172, which has an inductance value of 27 nH. Curve S113 is a radiating efficiency of the radiating portion A1 when the moving module 23 is slid to the first position and the switching circuit 17 is switched to the first switching unit 172 which has an inductance value of 80 nH.

Figure 12:
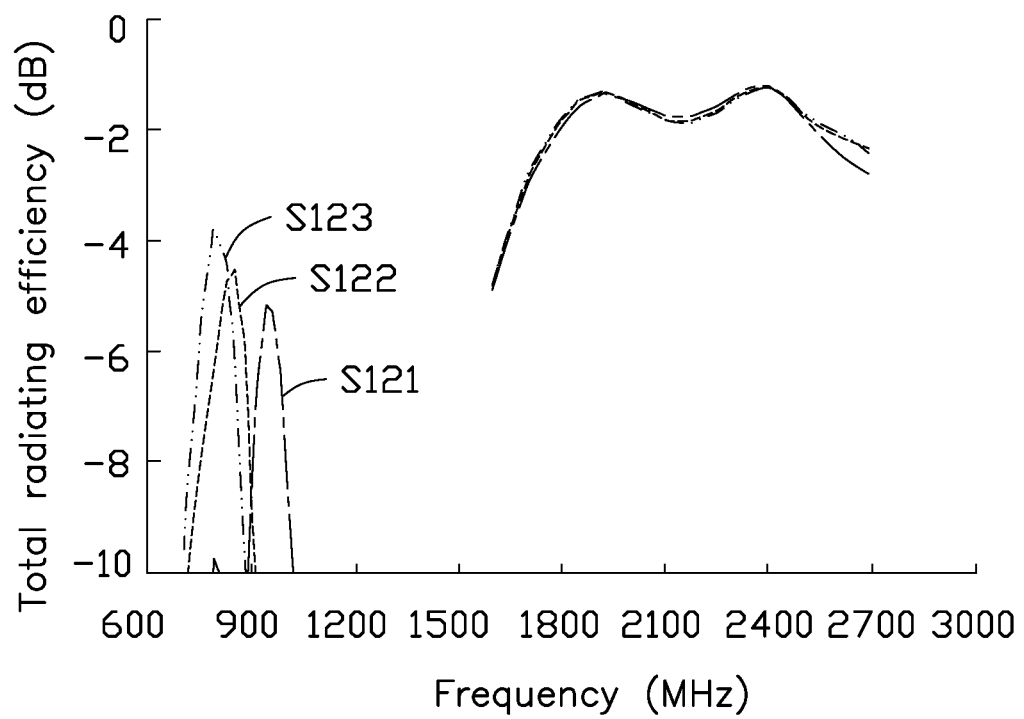
FIG. 12 is a total radiating efficiency graph of the first radiating portion when the moving module of FIG. 4 is moved to the first position and the switching circuit is switched to the first switching unit.

FIG. 12 shows a total radiating efficiency graph of the radiating portion A1 when the moving module 23 is slid to the second position and the switching circuit 17 is switched to the second switching unit 174. Curve S121 is a radiating efficiency of the radiating portion A1 when the moving module 23 is slid to the second position and the switching circuit 17 is switched to the second switching unit 174 which has an inductance value of 10 nH. Curve S122 is a radiating efficiency of the radiating portion A1 when the moving module 23 is slid to the second position and the switching circuit 17 is switched to the second switching unit 174 which has an inductance value of 20 nH. Curve S123 is a radiating efficiency of the radiating portion A1 when the moving module 23 is slid to the second position and the switching circuit 17 is switched to the second switching unit 174 which has an inductance value of 30 nH.

As shown in FIG. 11 and FIG. 12, the moving module 23 being in the first position or the second position has no effect on the low frequency radiating efficiency of the first radiating portion A1. This efficiency is greater than −6 dB, the middle and high radiating efficiencies of the first radiating portion A1 being greater than −4 dB. The antenna structure 100 can cover the 700-960 MHz frequency band, and the scattering parameters of the antenna structure 100 are less than −5 dB, which satisfies the design requirements of the diversity antenna. In addition, in this embodiment, when the moving module 23 is moved to the first position (i.e., the electronic component 231 is in an closed state), the impedance value corresponding to each low frequency band that the switching circuit 17 can switch to is greater than the impedance values corresponding to those which are available when the moving module 23 is in the second position (the electronic component 231 being in an open state when in the second position).

Figure 13:
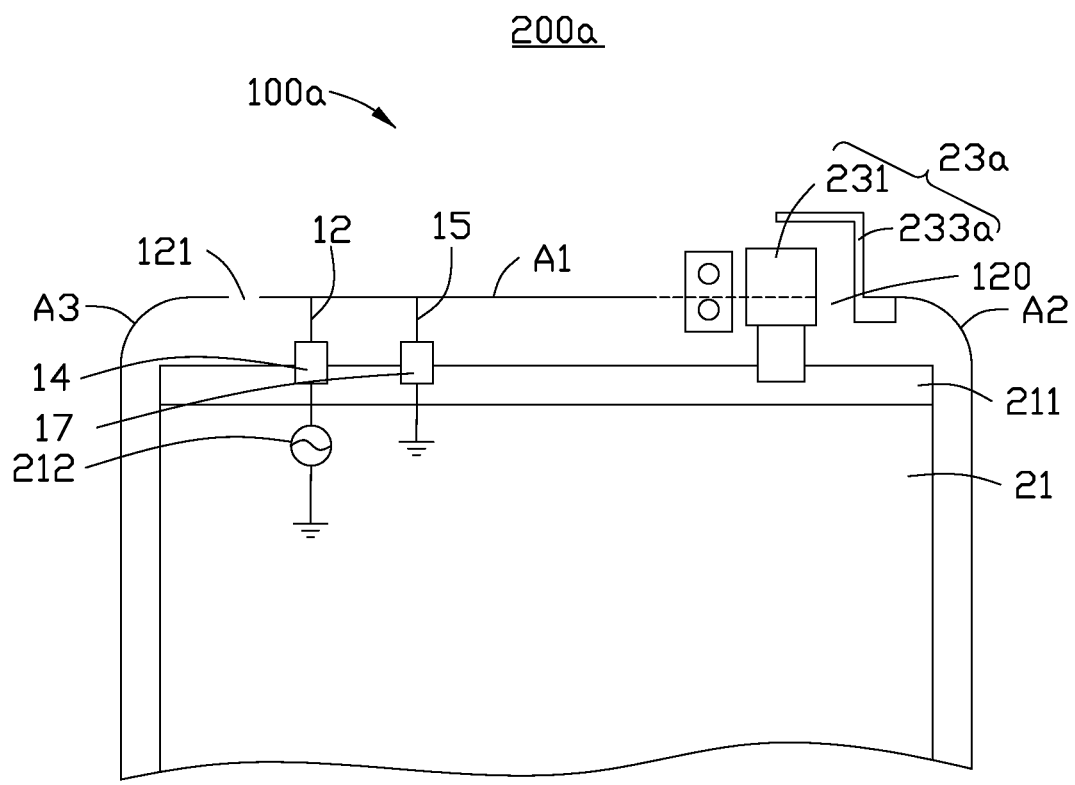
FIG. 13 is an isometric view of a wireless communication device according to a second embodiment.

FIG. 13 shows a wireless communication device 200a using an antenna structure 100a according to a second embodiment. The wireless communication device 200a can be, for example, a mobile phone or a personal digital assistant. The antenna structure 100a can receive and transmit wireless signals.

The antenna structure 100a includes a moving module 23a. The moving module 23a includes an electronic element 231 and an extending portion 233a. The antenna structure 100a includes a first feeding portion 12, a matching circuit 14, a connecting portion 15, and a switching circuit 17. The wireless communication device 200a further defines a first gap 120 and a second gap 121. The first gap 120 and the second gap 121 cooperatively divide the wireless communication device 200a to form three radiating portions including a first radiating portion A1, a second radiating portion A2, and a third radiating portion A3.

Difference between the antenna structure 100a and the antenna structure 100 is the positioning of the extending portion 233a. In this embodiment, the extending portion 233a is positioned at a side of the electronic element 231 opposite to the first radiating portion A1 and corresponds to the second radiating portion A2. Thus, when the moving module 23a is slid to the first position, the extending portion 233a is spaced apart from the second grounding portion A2 or the extending portion 233a is directly grounded. When the moving module 23a is slid to the second position, the extending portion 233a contacts the second radiating portion A2 and is electrically connected to the second radiating portion A2, effectively lengthening the second radiating portion A2. When the first feeding portion 12 supplies current, the current flows through the first radiating portion A1, and is coupled to the extending portion 233a through the first gap 120.

Figure 14:
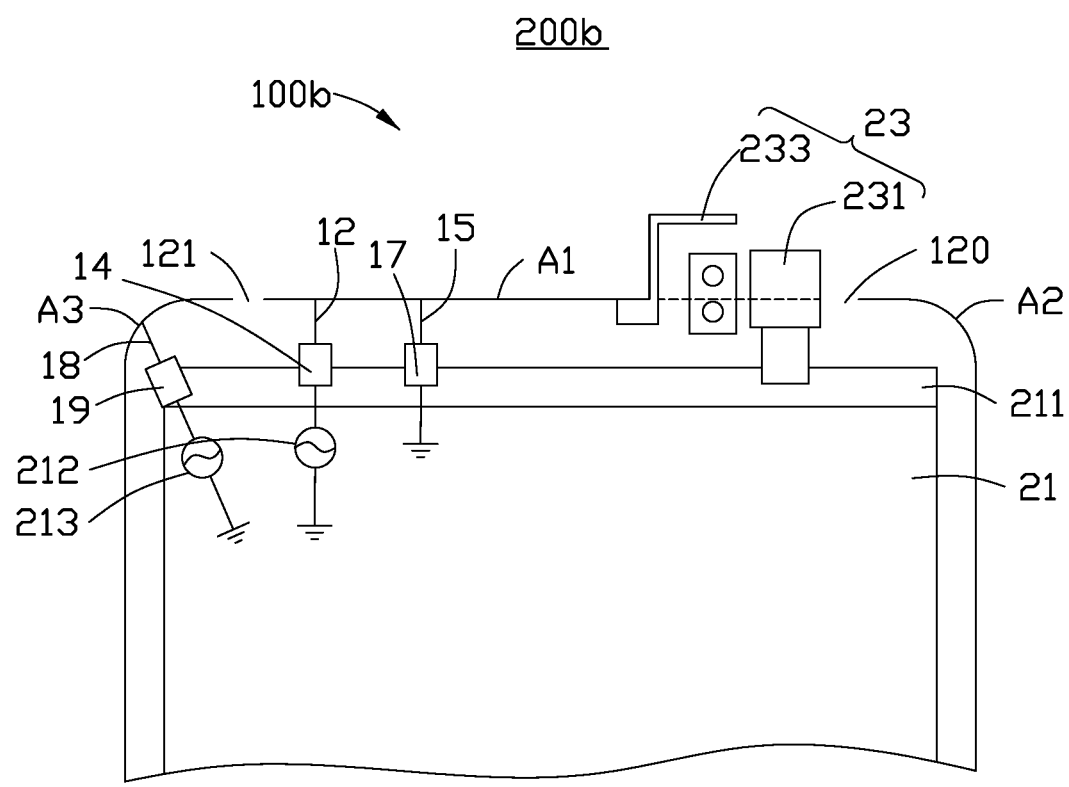
FIG. 14 is an isometric view of a wireless communication device according to a third embodiment.

FIG. 14 shows a wireless communication device 200b using an antenna structure 100b according to a third embodiment. The wireless communication device 200b can be, for example, a mobile phone or a personal digital assistant. The antenna structure 100b can receive and transmit wireless signals.

The wireless communication device 200b includes a moving module 23. The moving module 23 includes an electronic element 231 and an extending portion 233. The antenna structure 100b includes a first feeding portion 12, a matching circuit 14, a connecting portion 15, and a switching circuit 17. The wireless communication device 200b further defines a first gap 120 and a second gap 121. The first gap 120 and the second gap 121 cooperatively divide wireless communication device 200b to form three radiating portions including a first radiating portion A1, a second radiating portion A2, and a third radiating portion A3.

Difference between the antenna structure 100b and the antenna structure 100 is that the antenna structure 100b further includes a second feeding portion 18. The second feeding portion 18 can be a connecting structure such as a metal sheet, a screw, a feeder, a probe, or the like. An end of the second feeding portion 18 is electrically connected to one of the second radiating portion A2 and the third radiating portion A3 through a matching circuit 19. Another end of the second feeding portion 18 is electrically connected to an end of a second feeding source 213 positioned on the baseboard 21 thereby feeding current to either the second radiating portion A2 or the third radiating portion A3. Another end of the second feeding source 213 is grounded.

When the second feeding portion 18 is electrically connected to either the second radiating portion A2 or the third radiating portion A3, a second antenna is formed. The second antenna can be a global positioning system (GPS) antenna or a WIFI antenna.

Figure 15:
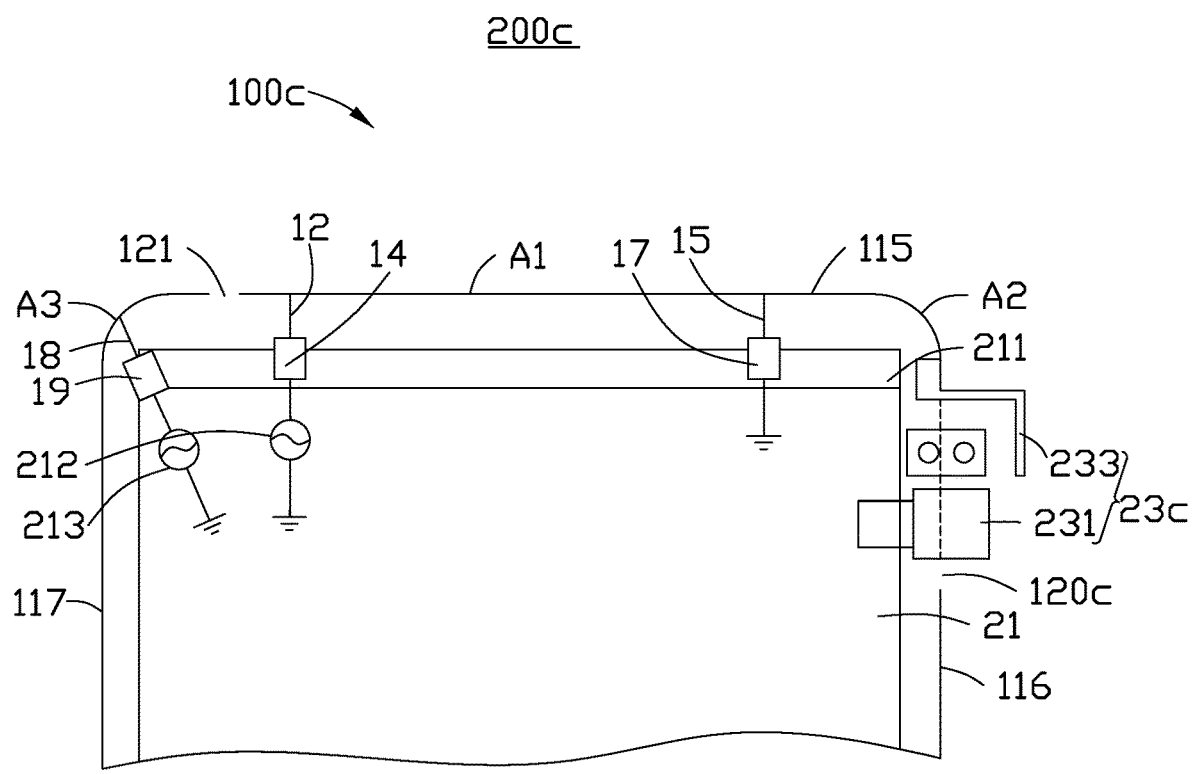
FIG. 15 is an isometric view of a wireless communication device according to a fourth embodiment.

FIG. 15 shows a wireless communication device 200c using an antenna structure 100c according to a fourth embodiment. The wireless communication device 200c can be, for example, a mobile phone or a personal digital assistant. The antenna structure 100c can receive and transmit wireless signals.

The wireless communication device 200c includes a moving module 23c. The moving module 23c includes an electronic element 231 and an extending portion 233. The antenna structure 100c includes a first feeding portion 12, a matching circuit 14, a connecting portion 15, a switching circuit 17, and a second feeding portion 18. The wireless communication device 200c further defines a first gap 120 and a second gap 121.

Difference between the antenna structure 100c and the antenna structure 100b is the positioning of the first gap 120c. In this embodiment, the first gap 120c is not defined at the end portion 115 but is defined at the first side portion 116 adjacent to the electronic element 231.

Since the first gap 120c is defined at the first side portion 116, the moving module 23c is positioned at a side of the wireless communication device 200c and is not at the end portion 115.

Figure 16A:
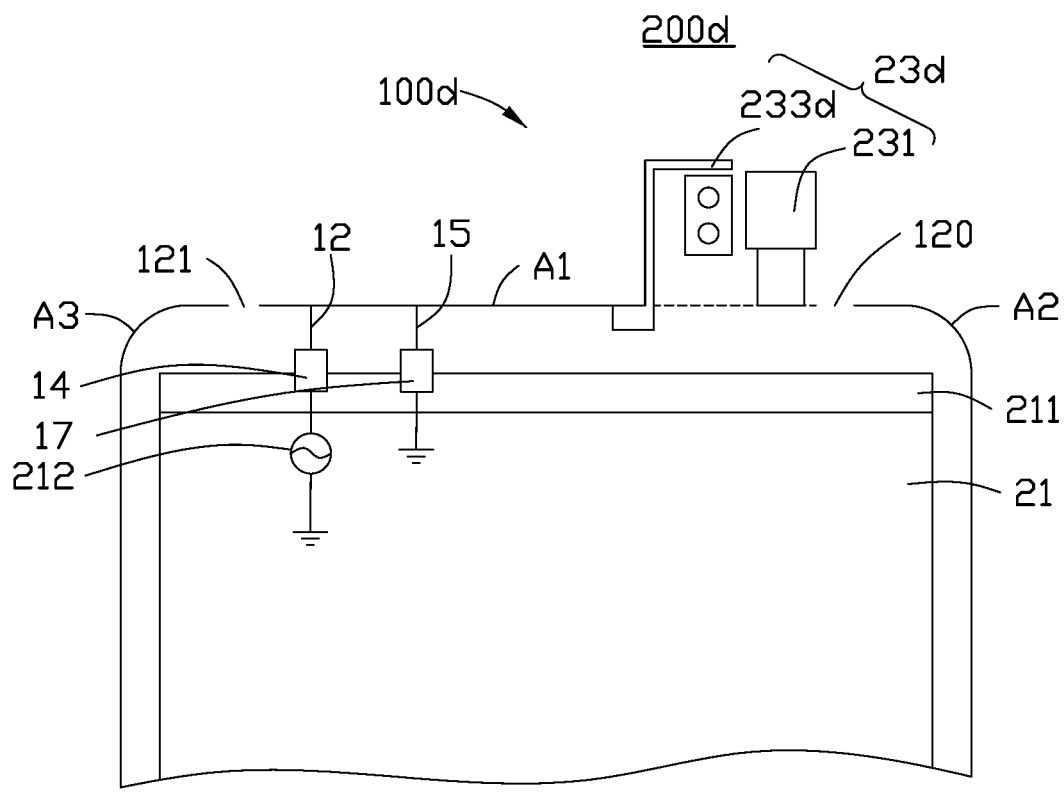
FIGS. 16A and 16B are isometric views of a wireless communication device according to a fifth embodiment.
Figure 16B:
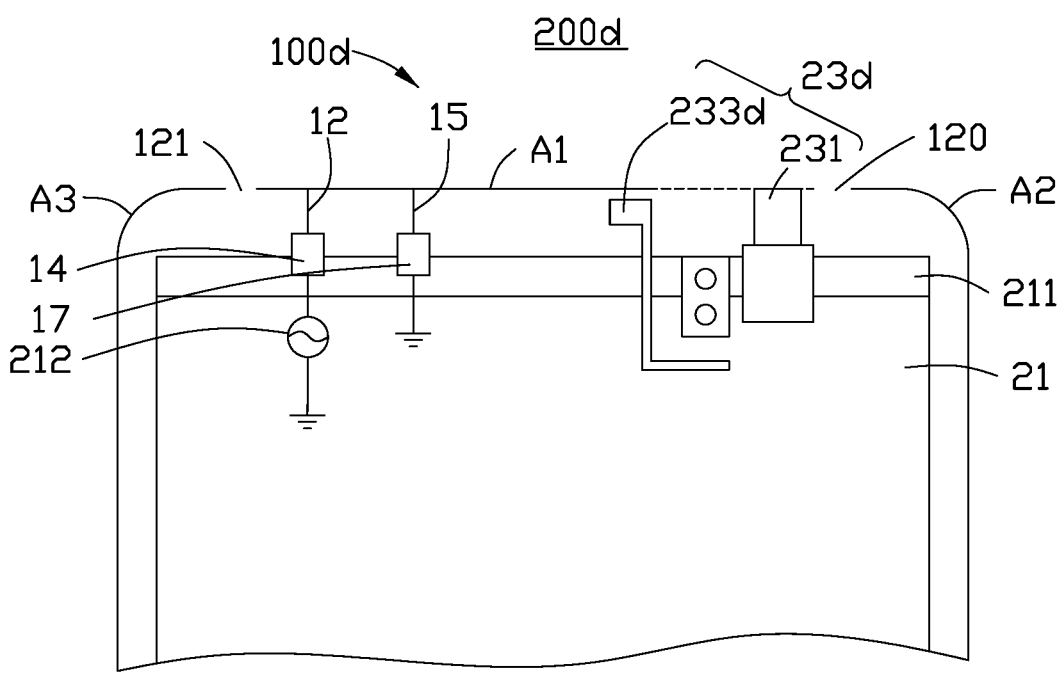

FIG. 16 shows a wireless communication device 200d using an antenna structure 100d according to a fourth embodiment. The wireless communication device 200d can be, for example, a mobile phone or a personal digital assistant. The antenna structure 100d can receive and transmit wireless signals.

The wireless communication device 200d includes a moving module 23d. The moving module 23d includes an electronic element 231 and an extending portion 233d. The antenna structure 100d includes a first feeding portion 12, a matching circuit 14, a connecting portion 15, and a switching circuit 17. The wireless communication device 200c further defines a first gap 120 and a second gap 121.

Difference between the antenna structure 100d and the antenna structure 100 is the manner of movement of the moving module 23d. In this embodiment, the moving module 23d is not slid but is rotated relative to the side frame 110. Thus, when the moving module 23d is rotated to a first position, for example, the moving module 23 is positioned inside the side frame 110, and the electronic element 231 is closed, the extending portion 233 is spaced apart and is not connected to the at least one radiating portion, such as the first radiating portion A1, or the extending portion 233 can be directly grounded. When the moving module 23 is rotated to a second position, for example, the moving module 23 is exposed out from the cut 123, and the electronic element 231 is open, the extending portion 233 is moved with the electronic element 231 thereby making contact with the at least one radiating portion such as the first radiating portion A1. Electromagnetic interference when the extending portion 233 is slid to the second portion is greater than that generated when the extending portion 233 is slid to the first portion. Thus, the moving module 23 can effectively lengthen the first radiating portion A1 to improve radiation characteristics of the first radiating portion A1.

Since the moving module 23d is rotated to first or second position relative to the side frame 110, the electronic element 231 respectively faces two different directions. For example, when the electronic element 231 is a camera, the electronic element 231 can rotate to face or turn away from a user by rotating the moving module 23d. Thus, the wireless communication device 20 can obtain images of front and back views.

In other embodiment, the number of extending portions 233/233a/233d is not limited to one of each. For example, the moving modules 23/23a/23c/23d can include extending portions 233/233a/233d. The extending portions 233/233a/233d can be positioned at sides of the electronic element 231. Thus, when the moving module 23 moves to the second position, the extending portions 233/233a/233d can respectively be electrically connected to the radiating portions (e.g. both the first radiating portion A1 and the second radiating portion A2) positioned at two side of the gap (e.g. the first gap 120/120c) are electrically connected.

In other embodiment, the number of electronic elements 231 of the moving modules 23/23a/23c/23d is not limited to one. For example, the moving modules 23/23a/23c/23d can each include two electronic elements 231, the number of the electronic elements 231 can be adjusted according to requirements.

In other embodiment, the first and second antennas are not limited to being only those described. The first and second antennas may include diversity antenna, GPS antenna, and WIFI antenna, as described above, and can also include BLUETOOTH antenna, NFC antenna, or others.

The wireless communication devices 200/200a/200b/200c/200d use the extending portions 233/233a/233d to extend the radiating portion to the outside or exterior. Therefore, the influence of a ground plane of the wireless communication devices 200/200a/200b/200c/200d is effectively reduced. The antenna characteristics are improved. Furthermore, by adjusting the feeding, grounding, and switching circuits of the radiating portion, characteristics such as a wider frequency width and a better radiating efficiency can be achieved.

The embodiments shown and described above are only examples. Many details are often found in the art such as the other features of the antenna structure and the wireless communication device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising:
a side frame made of metallic material, the side frame defining a first gap and a second gap being spaced apart from the first gap, wherein the first gap and the second gap pass through the side frame to form at least one radiating portion, the at least one radiating portion being a portion of the side frame and being unmovable;

a first feeding portion connected to one of the at least one radiating portion, and configured for feeding current to the radiating portion; and a moving module comprising an extending portion made of metallic material, wherein the moving module is movable relative to the side frame, when the moving module is moved to a first position, the extending portion is not connected to any radiating portion, when the moving module is moved to a second position, the extending portion is connected to one of the at least one radiating portion.

2. The antenna structure of claim 1, wherein the at least one radiating portion comprises a first radiating portion, a second radiating portion, and a third radiating portion, the side frame comprises an end portion, a first side portion, and a second side portion opposite to the first side portion, the first side portion and the second side portion are connected to two ends of the end portion, a portion of the side frame between the first gap and the second gap forms the first radiating portion, a portion of the side frame extending from a side of the first gap away from the second gap and toward the first side portion forms the second radiating portion, a portion of the side frame extending from a side the second gap away from the first gap and toward the second side portion forms the third radiating portion, an end of the first feeding portion is electrically connected to the first radiating portion, another end of the first feeding portion is electrically connected to a first feeding source configured for feeding current to the first feeding portion, when the moving module is moved to the second position, the extending portion is connected to one of the first radiating portion and the second radiating portion.

3. The antenna structure of claim 2, further comprising a second feeding portion, wherein an end of the second feeding portion is electrically connected to one of the second radiating portion and the third radiating portion, another end of the second feeding portion is electrically connected to a second feeding source configured for feeding current to one of the second feeding portion and the third radiating portion.

4. The antenna structure of claim 3, wherein the first radiating portion forms a first antenna, one of the second radiating portion and the third radiating portion forms a second antenna, the first radiating portion and the second radiating portion are two of an LTE-A antenna, a GPS antenna, a WIFI antenna, a Bluetooth antenna, and a NFC antenna.

5. The antenna structure of claim 2, wherein the moving module comprises an electronic element, the extending portion is positioned at one side of the electronic element, when the moving module is moved to the first position, the electronic element is received in the side frame and in a closed state, when the moving module is moved to the second position, the electronic element is exposed out from the side frame and in an open state.

6. The antenna structure of claim 5, further comprising a connecting portion and a switching circuit, an end of the connecting portion is electrically connected to the first radiating portion, wherein the switching circuit comprises a switch, a first switching unit, and a second switching unit, the switch is electrically connected to the first radiating portion through the connecting portion, the first switching unit comprises a number of first switching elements connected in parallel, an end of each of the first switching elements is electrically connected to the switch, the other end of each of the first switching elements is grounded, the second switching unit comprises a number of second switching elements connected in parallel, an end of each of the second switching elements is electrically connected to the switch, the other end of each of the second switching elements is grounded, when the moving module is moved to the first position, under the control of the switch, the first radiating portion is switched to connect to different one of the first switching elements to adjust a first working frequency of the first radiating portion, when the moving module is moved to the second position, under the control of the switch, the first radiating portion is switched to connect to different one of the second switching elements to adjust a second working frequency of the first radiating portion.

7. The antenna structure of claim 6, wherein an impedance of each first switching element is greater than that of each second switching element when the first radiating portion is operating at a same frequency band.

8. The antenna structure of claim 5, wherein the antenna structure comprises two extending portions, the two extending portions are positioned at two sides of the electronic elements, when the movable module is slid to the second position, the two extending portions are respectively connected two different radiating portions.

9. The antenna structure of claim 5, wherein the electronic element is an optical module or an acoustic module.

10. The antenna structure of claim 5, wherein the moving module is rotatable relative to the side frame, when the moving module is rotated to the first position and the second position, the electronic element faces two opposite directions.

11. A wireless communication device comprising:
an antenna structure comprising:
a side frame made of metallic material, the side frame defining a first gap and a second gap being spaced apart from the first gap, wherein the first gap and the second gap pass through the side frame to form at least one radiating portion, the at least one radiating portion being a portion of the side frame and being unmovable;
a first feeding portion connected to one of the at least one radiating portion, and configured for feeding current to the radiating portion; and
a moving module comprising an extending portion made of metallic material, wherein the moving module is movable relative to the side frame, when the moving module is moved to a first position, the extending portion is not connected to any radiating portion, when the moving module is moved to a second position, the extending portion is connected to one of the at least one radiating portion.

12. The wireless communication device of claim 11, wherein the at least one radiating portion comprises a first radiating portion, a second radiating portion, and a third radiating portion, the side frame comprises an end portion, a first side portion, and a second side portion opposite to the first side portion, the first side portion and the second side portion are connected to two ends of the end portion, a portion of the side frame between the first gap and the second gap forms the first radiating portion, a portion of the side frame extending from a side of the first gap away from the second gap and toward the first side portion forms the second radiating portion, a portion of the side frame extending from a side the second gap away from the first gap and toward the second side portion forms the third radiating portion, an end of the first feeding portion is electrically connected to the first radiating portion, another end of the first feeding portion is electrically connected to a first feeding source configured for feeding current to the first feeding portion, when the moving module is moved to the second position, the extending portion is connected to one of the first radiating portion and the second radiating portion.

13. The wireless communication device of claim 12, further comprising a second feeding portion, wherein an end of the second feeding portion is electrically connected to one of the second radiating portion and the third radiating portion, another end of the second feeding portion is electrically connected to a second feeding source configured for feeding current to one of the second feeding portion and the third radiating portion.

14. The wireless communication device of claim 13, wherein the first radiating portion forms a first antenna, one of the second radiating portion and the third radiating portion forms a second antenna, the first radiating portion and the second radiating portion are two of an LTE-A antenna, a GPS antenna, a WIFI antenna, a Bluetooth antenna, and a NFC antenna.

15. The wireless communication device of claim 12, wherein the moving module comprises an electronic element, the extending portion is positioned at one side of the electronic element, when the moving module is moved to the first position, the electronic element is received in the side frame and in a closed state, when the moving module is moved to the second position, the electronic element is exposed out from the side frame and in an open state.

16. The wireless communication device of claim 15, further comprising a connecting portion and a switching circuit, an end of the connecting portion is electrically connected to the first radiating portion, wherein the switching circuit comprises a switch, a first switching unit, and a second switching unit, the switch is electrically connected to the first radiating portion through the connecting portion, the first switching unit comprises a number of first switching elements connected in parallel, an end of each of the first switching elements is electrically connected to the switch, the other end of each of the first switching elements is grounded, the second switching unit comprises a number of second switching elements connected in parallel, an end of each of the second switching elements is electrically connected to the switch, the other end of each of the second switching elements is grounded, when the moving module is moved to the first position, under the control of the switch, the first radiating portion is switched to connect to different one of the first switching elements to adjust a first working frequency of the first radiating portion, when the moving module is moved to the second position, under the control of the switch, the first radiating portion is switched to connect to different one of the second switching elements to adjust a second working frequency of the first radiating portion.

17. The wireless communication device of claim 16, wherein an impedance of each first switching element is greater than that of each second switching element when the first radiating portion is operating at a same frequency band.

18. The wireless communication device of claim 15, wherein the antenna structure comprises two extending portions, the two extending portions are positioned at two sides of the electronic elements, when the movable module is slid to the second position, the two extending portions are respectively connected two different radiating portions.

19. The wireless communication device of claim 15, wherein the electronic element is an optical module or an acoustic module.

20. The wireless communication device of claim 15, wherein the moving module is rotatable relative to the side frame, when the moving module is rotated to the first position and the second position, the electronic element faces two opposite directions.

* * * * *